(12) United States Patent
Stillwell, Jr. et al.

(10) Patent No.: US 7,996,663 B2
(45) Date of Patent: Aug. 9, 2011

(54) SAVING AND RESTORING ARCHITECTURAL STATE FOR PROCESSOR CORES

(75) Inventors: Paul M. Stillwell, Jr., Aloha, OR (US);
Sorin Iacobovici, San Jose, CA (US);
Moenes Iskarous, San Jose, CA (US)

(73) Assignee: Intel Corporation, Santa Clara ( * ) Notice: Subject to any disclaimer, the term of this patent is extended or adjusted under 35 U.S.C. 154(b) by 689 days.

(21) Appl. No.: 11/965,167

(22) Filed: Dec. 27, 2007

(65) Prior Publication Data

US 2009/0172369 A1 Jul. 2, 2009

(51) Int. Cl.
*G06F 9/312* (2006.01)
(52) U.S. Cl. .......................... 712/244; 712/228
(58) Field of Classification Search .................. None
See application file for complete search history.

(56) References Cited

U.S. PATENT DOCUMENTS

| | | | |
|---|---|---|---|
| 5,926,646 A * | 7/1999 | Pickett et al. ................... 712/32 |
| 6,212,609 B1 | 4/2001 | Bennett et al. |
| 6,223,208 B1 * | 4/2001 | Kiefer et al. .................. 718/108 |
| 6,516,395 B1 * | 2/2003 | Christie ......................... 711/163 |
| 6,671,762 B1 * | 12/2003 | Soni et al. ..................... 710/267 |
| 6,810,476 B2 * | 10/2004 | McGrath et al. .............. 712/228 |
| 7,130,977 B1 * | 10/2006 | Christie et al. ................ 711/163 |
| 7,209,994 B1 * | 4/2007 | Klaiber et al. ................ 710/264 |
| 7,254,744 B2 | 8/2007 | Dunston |
| 7,487,502 B2 | 2/2009 | Wang |
| 7,500,049 B2 | 3/2009 | Dixon |
| 7,631,307 B2 | 12/2009 | Desai et al. |
| 7,707,341 B1 * | 4/2010 | Klaiber et al. ................ 710/244 |
| 7,778,271 B2 * | 8/2010 | Day et al. ...................... 370/464 |
| 2003/0033507 A1 * | 2/2003 | McGrath ....................... 712/225 |
| 2003/0110012 A1 * | 6/2003 | Orenstien et al. ............. 702/188 |
| 2004/0019771 A1 * | 1/2004 | Quach ........................... 712/229 |
| 2004/0098429 A1 * | 5/2004 | Crispin et al. ................ 708/250 |
| 2004/0123201 A1 * | 6/2004 | Nguyen et al. ............... 714/736 |
| 2005/0223199 A1 | 10/2005 | Grochowski |
| 2007/0079150 A1 * | 4/2007 | Belmont et al. .............. 713/300 |

OTHER PUBLICATIONS

Kumar, R, et al., Single-ISA Heterogeneous Muiti-Core Architectures: The Potential for Processor Power Reduction, 2003, Proceeding of the 36th Intl, Symposium on Microarchitecture, IEEE, 12 pages.*
Shateyesteh, A, et al., Reducing the Latency and Area Cost of Core Swapping through Helper Engines,2005, Proceeding of the 2005 Intl. Conference on Computer Design, IEEE, 7 pages.*
Kursun, E. etal., Low Overhead Core Swapping for Thermal Management, 2005, Springer-Verlag, pp. 46-57.*

* cited by examiner

*Primary Examiner* — Eric Coleman
(74) *Attorney, Agent, or Firm* — David P. McAbee

(57) ABSTRACT

A method and apparatus for saving and restoring architectural states utilizing hardware is described. A first portion of an architectural state of a processing element, such as a core, is concurrently saved upon being updated. A remaining portion of the architectural state is saved to memory in response to a save state triggering event, which may include a hardware event or a software event. Once saved, the state is potentially transferred to another processing element, such as a second core. As a result, hardware, software, or combination thereof may transfer architectural states between multiple processing elements, such as threads or cores, of a processor utilizing hardware support.

23 Claims, 3 Drawing Sheets

SAVING AND RESTORING ARCHITECTURAL STATE FOR PROCESSOR CORES

FIELD

This invention relates to the field of hierarchal memory in computer systems and, in particular, to saving and restoring an architectural state of cores of a physical processor.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

Currently, processors may include as many as four or eight cores. However, future processors are contemplated to include 64 or more cores on a physical die. In addition, within each core, more cases have developed where an architectural state of a core needs to be saved. However, current architectural states of cores are often stored through microcode.

Therefore, currently when a failure occurs on a core in a processor, the failure is potentially fatal resulting in a loss of the core. Additionally, even if the core is able to be recovered, previous execution on that processor is often lost. Additionally, when a section of a processor becomes too hot or too active, there is no current method of distributing workload among other available cores. In contrast, thermal issues are often dealt with through throttling, which potentially adversely affects execution performance.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific architectural state components, types of registers, types of memory, specific multi-core architecture, specific save state triggering events, etc. in order to provide a thorough understanding of the present invention. It will be apparent, however, to one skilled in the art that these specific details need not be employed to practice the present invention. In other instances, well known components or methods, such as architectural state details, alternate multi-core implementations, format of saved architectural states in memory, and other specific operation details, have not been described in detail in order to avoid unnecessarily obscuring the present invention.

The method and apparatus described herein are for saving and restoring architectural states. Specifically, saving and restoring architectural states is primarily discussed in reference to moving one cores state to another core utilizing hardware. However, the methods and apparatus for saving and restoring architectural states are not so limited, as they may be implemented on or in association with any computer system, such as transferring state between multiple physical processors of a multi-processor system, as well as utilizing a software, hardware, firmware, or a combination thereof to transfer state.

Figure 1:
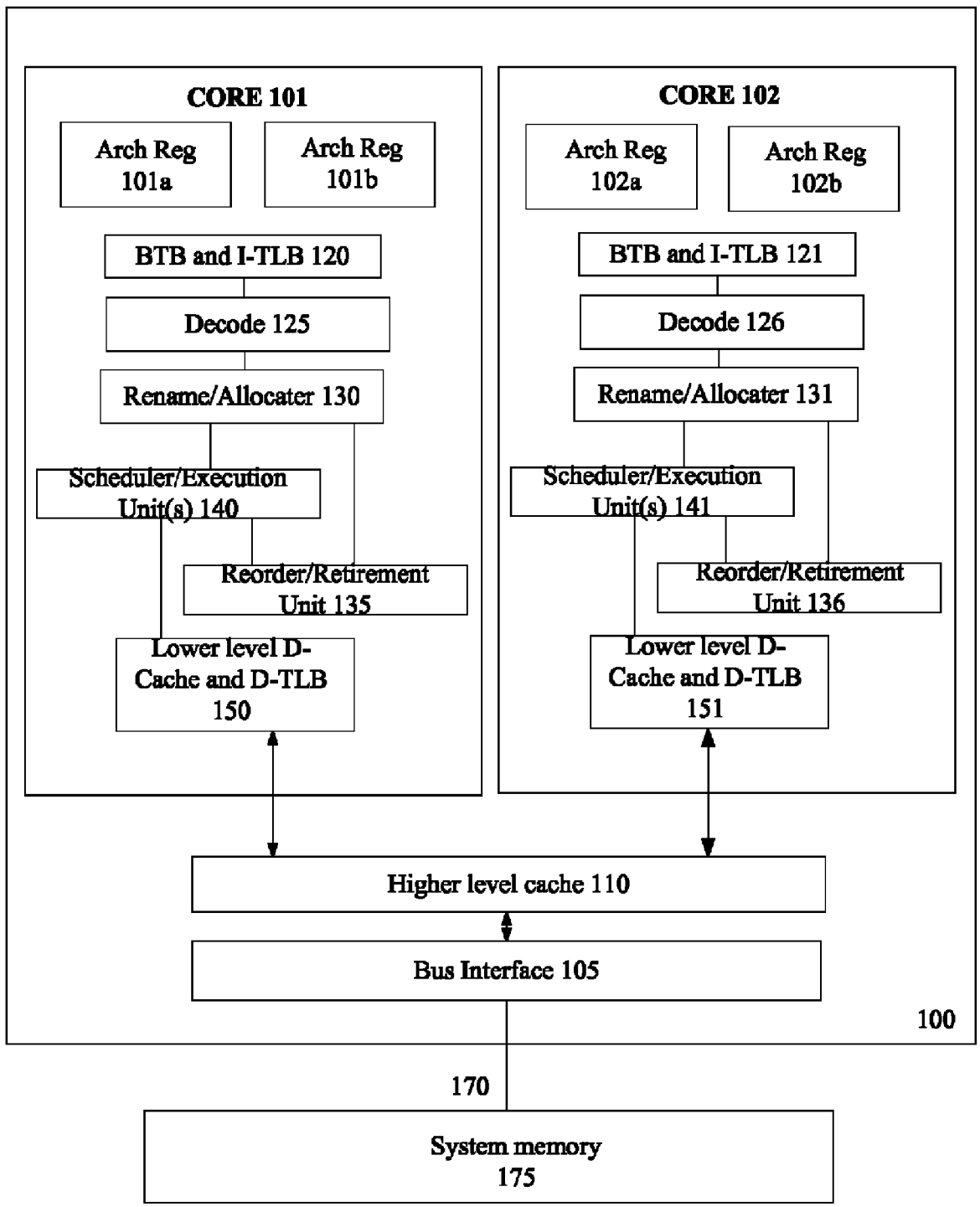
FIG. 1 illustrates an embodiment a processor including hardware to support transferring of architectural states between processing elements.

Referring to FIG. 1, an embodiment of a multi-processing element processor hardware to support saving and restoring of architectural states is illustrated. A processing element refers to a thread, a process, a context, a logical processor, a hardware thread, a core, and/or any processing element, which utilizes resources of the processor, such as reservation units, execution units, pipelines, and/or higher level caches/memory. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources.

Often an architectural state refers to registers, storage elements, states, and/or information to hold a state of a processing element, process, context, thread or core. Examples of information/registers for an architectural state includes: (1) control registers, such as instruction flag registers, interrupt mask registers, memory management registers, and status registers; (2) general purpose registers, such as address registers, counter registers, index registers, an stack registers; and (3) Models Specific Registers (Mars). Examples of control registers in Intel Architecture (IA) includes CR0, CR1, CR2, CR3, and CR4. Examples of general purpose registers in IA includes AX, BX, COX, DX, etc.

Note however, that these registers are purely illustrative and different registers, as well as a subset of the type of registers described above may comprise an architectural state. In one embodiment, a state of a process, context, thread, or core includes an architectural state and a micro-architectural state, which herein may be broadly discussed as an architectural state. In one embodiment, saving/storing an architectural state includes saving/storing information held in a combination of registers or other storage elements, as discussed above. Although not described in detail in order to avoid obscuring the invention, a predefined structure for holding information in a memory for a save state may be utilized. Furthermore, restoring a state may including copying save architectural state information to corresponding registers, storage elements, etc. to place a context, thread, or core in the saved architectural state.

Physical processor 100, as illustrated in FIG. 1, includes two cores, core 101 and 102, which share access to higher level cache 110. In addition, core 101 includes two hardware threads 101a and 101b, while core 102 includes two hardware threads 102a and 102b. Therefore, software entities, such as an operating system, potentially view processor 100 as four separate processors, while processor 100 is capable of executing four software threads.

As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor. In other words, software views two cores or threads on a physical processor as two independent processors. Additionally, each core potentially includes multiple hardware threads for executing multiple software threads. Therefore, a processing element includes any of the aforementioned elements capable of maintaining a context, such as cores, threads, hardware threads, virtual machines, or other resources.

In one embodiment, processor 100 is a multi-core processor capable of executing multiple threads in parallel. Here, a first thread is associated with architecture state registers 101a, a second thread is associated with architecture state registers 101b, a third thread is associated with architecture state registers 102a, and a fourth thread is associated with architecture state registers 102b. Reference to processing elements in processor 100, in one embodiment, includes reference to cores 101 and 102, as well as threads 101a, 101b, 102a, and 102b. In another embodiment, a processing element refers to elements at the same level in a hierarchy of processing domain. For example, core 101 and 102 are in the same domain level, and threads 101a, 101b, 102a, and 102b are in the same domain level, as they are all included within a core's domain.

Although processor 100 may include asymmetric cores, i.e. cores with different configurations, functional units, and/or logic, symmetric cores are illustrated. As a result, core 102, which is illustrated as identical to core 101, will not be discussed in detail to avoid obscuring the discussion.

As illustrated, architecture state registers 101a are replicated in architecture state registers 101b, so individual architecture states/contexts are capable of being stored for logical processor 101a and logical processor 101b. Other smaller resources, such as instruction pointers and renaming logic in rename allocater logic 130 may also be replicated for threads 101a and 101b. Some resources, such as re-order buffers in reorder/retirement unit 135, ITLB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Bus interface module 105 is to communicate with devices external to processor 100, such as system memory 175, a chipset, a northbridge, or other integrated circuit. Memory 175 may be dedicated to processor 100 or shared with other devices in a system. Examples of memory 175 includes dynamic random access memory (DRAM), static RAM (SRAM), non-volatile memory (NV memory), and long-term storage. Typically bus interface unit 105 includes input/output (I/O) buffers to transmit and receive bus signals on interconnect 170, such as a parallel bus, a serial bus, a differential bus, a cache coherent bus, or other known interconnect implementing any known bus protocol.

Higher-level or further-out cache 110 is to cache recently fetched and/or operated on elements. Note that higher-level or further-out refers to cache levels increasing or getting further way from the execution unit(s). In one embodiment, higher-level cache 110 is a second-level data cache. However, higher level cache 110 is not so limited, as it may be or include an instruction cache, which may also be referred to as a trace cache. A trace cache may instead be coupled after decoder 125 to store recently decode traces.

Module 120 potentially includes a branch target buffer to predict branches to be executed/taken and an instruction-translation buffer (I-TLB) to store address translation entries for instructions. Here, a processor capable of speculative execution potentially prefetches and speculatively executes predicted branches. Decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. In fact, instructions/operations are potentially scheduled on execution units according to their type availability. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation lookaside buffer (D-TLB) 150 are coupled to execution unit(s) 140. The data cache is to store recently used/operated on elements, such as data operands, which are potentially held in memory coherency states, such as modified, exclusive, shared, and invalid (MESI) states. The D-TLB is to store recent virtual/linear to physical address translations. As a specific example, a processor may include a page table structure to break physical memory into a plurality of virtual pages.

In one embodiment, processor 100 is capable of transferring architecture states between processing elements, such as core 101 and core 102 or between threads 101a, 101b, 102a, and 102b. Although only two cores are illustrated, in an embodiment where processor 100 includes more cores, architecture states may be transferred between a plurality of the cores. However, not every core need be equipped for architectural state transfer; yet, each core of a processor may be equipped for architectural state transfer.

In one embodiment, the architectural state transfer between cores 101 and 102 are capable of being facilitated by hardware. For example, core 101 and 102 include destination registers to hold destination addresses for associated architectural states to be stored/saved to, as well as restore registers to hold a restore address to load/restore an architectural state from. To illustrate, assume core 101 is to transfer its architectural state to core 102. A destination register associated with core 101 holds a destination address of a range of memory to store the corresponding architecture state to. Here, architectural state 101*a* and 101*b* is stored to the memory range based on the destination address held in the destination register.

In addition, a restore register in core 102 is to hold a restore address to restore an architectural state from. As a result, if the restore address references the same location as the destination address, then the saved architectural state of core 101 is restored/loaded to core 102. Note that, in a different embodiment, single thread states may be saved and restored, such as transferring an architectural state of thread 101*a* to thread 102*a*. Other registers may be included in cores 101 and 102 to facilitate architectural state transfer, such as an event register to hold a map of events that may trigger an architectural save state or transfer. In addition, control registers to track cores saving/restoring architectural states or available to do so may also be included. More discussion of hardware support for saving and restoring of architectural state is discussed below.

Triggering a save state or a transfer of state may be initiated through any number of events and/or methods. In one embodiment, an architectural event, such as a pipeline stall, a mispredicted branch/path, a long latency event, an enter of a power state, a received interrupt, an enter of a management mode, a management mode event, a secure enter into a secure environment, a secure exit from a secure environment, a secure environment event, or other known architectural event or condition triggers a save state and a potential restore to another processing element. As another example, software, such as operating system code, a hypervisor, or management code may provide the triggering event. Triggering of a save state is discussed in more detail below.

The processor architecture described above is purely illustrative to depict an exemplary architecture for transfer of states between multiple processing elements. However, any processor architecture, computer architecture, or architectural state may be utilized when saving and/or restoring states, as described herein.

Figure 2:
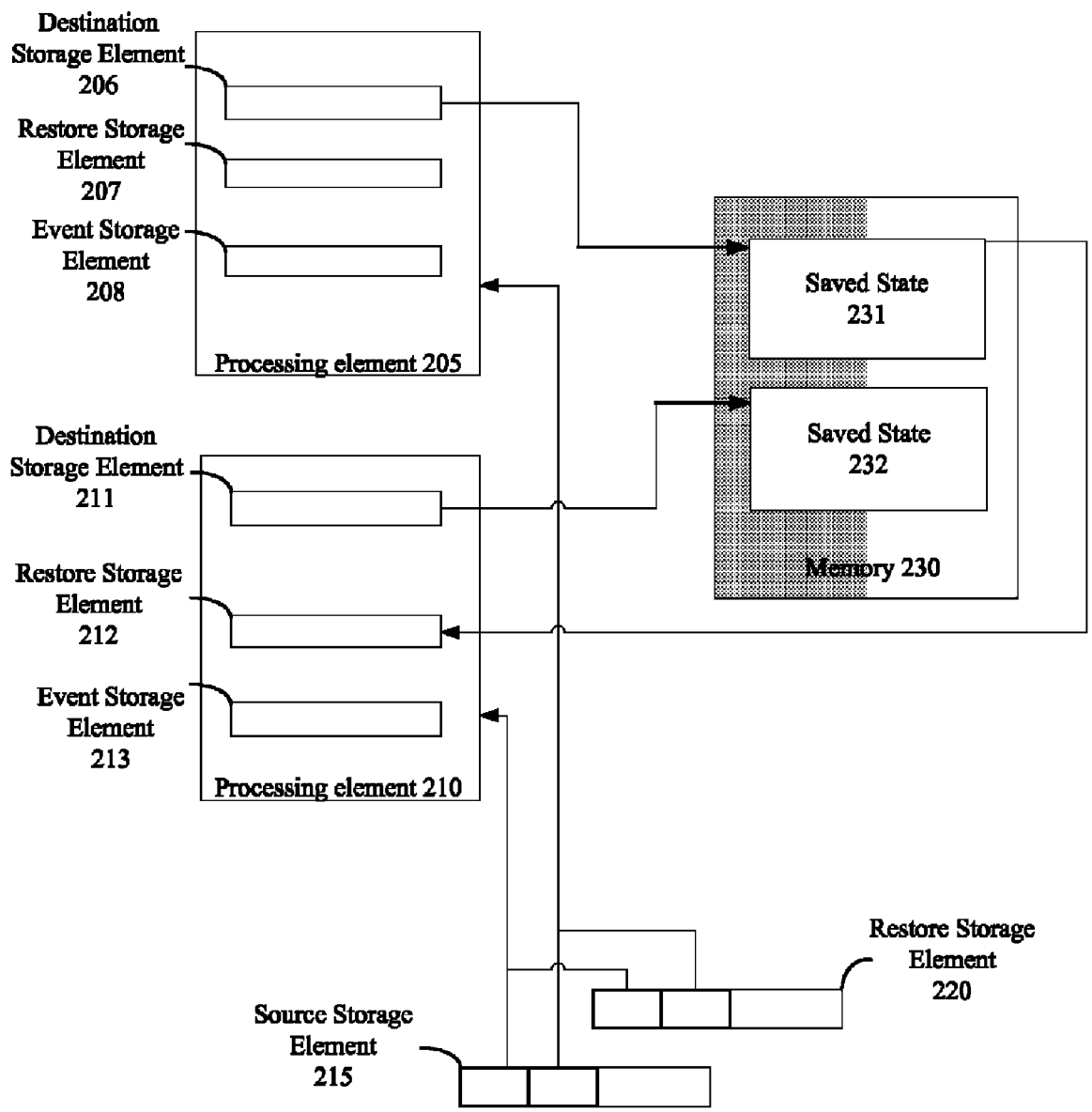
FIG. 2 illustrates an embodiment of hardware in multiple processing elements of a physical processor to support save and restore of architectural states.

Referring to FIG. 2, an embodiment of hardware to support saving and restoring of architectural states of processing elements is illustrated. Processor 200, in one embodiment, includes a physical processor comprising a plurality of processing elements, such as cores or threads. As depicted, only two processing elements are shown in processor 200. However, any number of processing elements may be included in processor 200. For example, processing elements 205 and 210 may be two cores of 8, 16, 64, or an other number of cores. Yet, to illustrate an embodiment for saving and restoring architectural state, processing elements 205 and 210 are described.

As stated above, processing elements 205 and 210 include a core, a hardware thread, a logical processor, or other element capable of holding an architectural state. As an illustrative example, processing elements 205 and 210 will be referred to as processor or processing cores, i.e. cores, for simplifying discussion of FIG. 2.

Processor 200 includes hardware support, such as storage elements, for storing architectural states to memory. A storage element includes an element to hold electronic information, such as a storage cell, a transistor, a group of transistors, a register, a memory, or other known computer related storage device. Therefore, in one embodiment, storage elements 206, 207, 208, 211, 212, 213, 215, and 220 are registers in processor 200. Furthermore, some of registers 206-208, 211-212, 215, and 220 may be referred to as being included with architectural state registers of cores 205 and 210, such as within the architectural states 101*a*, 101*b*, 102*a*, and 102*b* of FIG. 1. Here, registers, such as destination registers 206 may be replicated in each architectural state for every hardware thread and/or core.

Memory 230 is illustrated as associated with processor 200, and includes any memory device capable of holding architectural state information. In one embodiment, memory 230 includes a private memory device located on a physical die of processor 200. Here, a private memory may be provided for the purpose of architectural state saving. As illustrated, each core may be associated with a range/portion of memory, such as core 205 with range 231 and core 210 with range 232.

In another embodiment, memory 230 includes a cache memory associated with processor 200. Here, private portions of the cache may be carved out to hold save states 231 and 232. For example, a way of a cache is utilized for architectural save states. However, note that the ranges of memory may, but are not required, to be contiguous with each other. In yet another example, memory 230 resembles a system memory coupled to processor 200. As above, ranges 231 and 232 may be privately held within memory 230. To illustrate, in a secure environment, such as virtual machine extensions (VMX) architecture, a hypervisor, such as a virtual machine monitor (VMM), provides abstracted access for applications to hardware, while providing security between applications. As a result, save states may be included in a separate virtual machine (VM) with a high level of priority/security, or within a VMX memory range, which is privileged. Note, however, that these memory devices and storage elements are purely illustrative and any memory device may be utilized.

In one embodiment, an architectural state of core 205 is to be saved/written to memory 230. As stated above, architectural support for saving a state associated with core 205 may be provided in the form of storage elements, such as destination storage element 206. In one embodiment, destination storage element 206 is a destination register to hold a destination address to reference range of memory 231. Here, range 231 is for holding saved architectural state 231 associated with core 205.

As illustrated, destination address held in storage element 206 includes a base address of range 231 in memory. However, any address or other representation to reference range 231 may be utilized. Furthermore, a size value may be held in storage element 206 or in another storage element to indicate a size of range 231. However, in one embodiment, where a saved state held in memory, such as saved state 231, includes a predefined size and a predetermined structure, i.e. location of information for specific saved architectural state registers, no size value is needed as the predetermined structure allows saving of specific architectural state information to set offsets from a base address.

In one embodiment, saving of an architectural state of core 205 to memory 230 is in response to a save architectural state event. In one embodiment, a save architectural state event includes a physical architectural event, such as a core failure, a core failure event, a pipeline stall, a long latency event, a mispredicted path/branch, receiving an interrupt, entering/exiting power, management, or secure environment states, or other known physical architectural event. Common examples of architectural save state events include entering a low power state, such as C6 power state for Intel Architecture (IA) processors, entering or exiting a virtual machine in a virtualization environment, entering a system management mode, and receiving a system management interrupt.

However, in another embodiment, a save architectural state event refers to code or software related event to trigger a save state. In one embodiment, controlling software, such as an operating system, hypervisor, virtual machine monitor, and/or management/manageability code directs a save state. Examples of a software related save architectural state event includes a software directed power change save state event, a software directed thermal save state event, a secure environment save state event, a secure enter into a secure environment, a secure exit from a secure environment, a management save state event, an interrupt handler save state event, management software directed save state event, and any other controlling software directed save state event For example, an OS, a hypervisor, or a manageability module monitors thermal output of different sections of processor 200, core workload of cores 205 and 210, and/or power consumption of core 205 and 210. Here, assume, a section of processor 205 including four cores, one of which is core 205, is creating too much heat. Instead of throttling the cores, which potentially adversely affects performance, the controlling software determines that the workload on processor 205 should be moved to another cooler section of the processor, which includes processor 210. Instead of scrapping execution and restarting on a new core, the current architectural state of core 205 is saved and restored to core 210.

In one embodiment, event storage element (EVE) 208 is to hold a representation of save architectural state events. For example, EVE 208 includes a plurality of fields that correspond to save state events. In a specific illustrative embodiment, EVE 208 includes a bitmap of save architectural state events. Each bit essentially operates as a flag to indicate if an associated save architectural save state event has occurred.

To illustrate, a first Most Significant Bit (MSB) corresponds to a full failure of core 205, a second MSB corresponds to a pipeline stall on core 205, a third MSB is associated with entering a specific power state, a fourth MSB corresponds to an enter or exit of a secure environment, a fifth MSB is associated with an entrance of a system management mode (SMM), a sixth MSB corresponds to receiving an interrupt, and a seventh MSB is associated with a software directed save state event. In one embodiment, the order of the fields in EVE 208 indicates a priority of the associated events. Continuing the example from above, the more significant the bit the higher priority the event. As a result, a core failure is higher priority than a pipeline stall, which is higher priority than entering a power save state, and so forth.

Therefore, in response to detecting the save architectural state event the corresponding field in EVE 208 is updated to indicate the event has occurred. Note that where the event includes a software directed event, a field 208 may be updated by a write from software. In one embodiment, EVE 208 may be synchronously polled to check all the events that have occurred and to determine appropriate action. In another embodiment, updating a field in EVE 208 in response to a save state event results in an asynchronous initiation of a save state. Note that initiating a save state may not directly and immediately cause a save state, as the architectural state must be in a determinable state, such as the registers and register file being updated correctly.

In one embodiment, portions of an architectural state of core 205 are saved in different manners. Some of the architectural state is potentially infrequently updated and may be too slow for efficiently saving the entire state. For example, model specific registers (MSRs) in certain microprocessor implementations are infrequently updated and reside on a slower internal bus, which potentially results in difficult for a quick and efficient save of the state in response to a potentially asynchronous event. As a result, in one embodiment, a portion of the architectural state for core 205 is saved/written to memory 230 in response to being updated. This may also be referred to as a concurrent architectural state saving.

To illustrate, when an MSR is updated, the base destination address held in destination storage element 206 is utilized to identify range 231. An offset of a predefined structure where the information for the MSR is to be held in save state range 231 is determined, and the new updated values of the MSR is written to the correct offset within save state 231, accordingly. Therefore, in this example, when any MSR is updated, that portion of the architectural state is automatically saved to memory 230. Note that a save upon update portion of the architectural state is not limited to MSRs, and may encompass any infrequently updated portion of the architecture state or any portion of the architectural state that is difficult to quickly and efficiently save to memory. As a result, here, a save architectural state event/trigger may be considered an update to the portion of the architectural state.

Furthermore, in this embodiment, the remaining portion of the architectural state associated with core 205 is to be saved, written to memory 230, in response to encountering a different architectural state event. This may also be referred to as triggered state saving. To illustrate, assume all of the current information for MSRs of core 205 are held in save state range 231 of memory 230. When an update to an MSR occurs, a write to the destination address held in destination storage element 206, which may include a write to an offset added to a based destination address, is performed to update a corresponding location within save state range 231 with the current values/information for the MSR. Later, controlling software may determine that the workload of core 205 should be transferred to core 210. In one embodiment, the software performs a write to event storage element 208 to indicate a save of the architectural state should occur. Similar to the method above for the MSR, the non-MSR portion of the architectural state for core 205 is written to save state 231. The saved state of core 205 is then restored to core 210 from saved state range 231 as described below.

Note that core 210 includes destination storage element 211 and event storage element 213, which operate in a similar manner to destination storage element 206 and event storage element 208, as described above. Furthermore, restore storage element 212 is discussed below in reference to processing element 210; however, restore storage element 207 may also operate in a similar manner.

In one embodiment, processor 100 also includes hardware to facilitate/support restoring of architectural states. Here, restore storage element 212 is to hold a restore address to reference a save state area to restore from. Continuing the example above, when a state of core 205 is to be transferred to core 210, then the state of core 205 is stored to saved state 231. Furthermore, if necessary a current state of core 210 may be saved to saved state 232 in a similar manner based on a destination address held in destination storage element 211.

Nevertheless, the restore address held in restore storage element 212 references saved state 231. As an example, the restore address for core 210 is the same as the destination address for core 205. In this example, when software writes to event storage element 208 to indicate a save state event, the software may also write to restore element 212 to update the restore address to restore from saved state range 231. Consequently, when restoring a state on core 210, the saved state 231, which was associated with core 205, is restored on core 210. In other words, the architectural state is transferred from processing element 205 to processing element 210, i.e. processing element 205's state is saved in range 231 and restored to processing element 210 from saved state range 231.

In one embodiment, processor 200 also includes source/save element 215 and restore/destination element 220. Although source element 215 and destination element 220 are illustrated outside and independent from processing elements 205 and 210, they may be included in processing elements and replicated within each in a similar manner to the other storage elements shown. Here, each field of source element 215 and destination element 220 are associated with processing elements for processor 200.

In one embodiment, source element 215 is to hold values to represent processing elements wanting to store their state or in the process of saving their state, while destination element 215 is to hold values to represent processing elements available to restore a state or in the process of restoring a state.

Continuing the example from above, in response to a software write or updating a field of storage element 208, the second field in destination element 215 is updated to a save state value to indicate processing element 205 is wanting to save its state, wants to transfer its state, and/or is in the process of saving its state. Furthermore, restore element 220 includes a restore or available value in its first field corresponding to processing element 210, either in response to pure availability or the software write to restore storage element 212 of an address referencing saved state 231.

As a specific example, source element 215 and restore element 220 are registers including bitmaps to cores, source element includes a logical zero in the MSB to represent core 210 does not want to save a state and a logical one in the second MSB to indicate that processing element 205 wants to transfer its state. Here, the restore register includes a MSB of a logical one and a second MSB of a logical zero to indicate that core 210 is available for restoring a state and that core 205 is not. However, note that any values may be utilized in these storage elements. For example, a single register may be utilized where a core ID of a source core to transfer its state to a second core may be held in a field associated with the second core.

As stated above, reference to processing elements as a core is purely illustrative, as any processing element may be utilized. Furthermore, use of the phrase saving or writing an architectural state or a portion thereof "to a destination address" may encompass any number of writes to a range of addresses. For example, a write of a portion of an architecture state to a destination address may include a write of the portion to a generated address, which is generated from the destination address utilized as a base address with an offset to the generated address. Furthermore, as information for an architectural state is often too large to hold at a single address destination, a destination address may include a range of addresses, which may be defined by addresses at the bounds of the range or a base address plus a size value.

Figure 3:
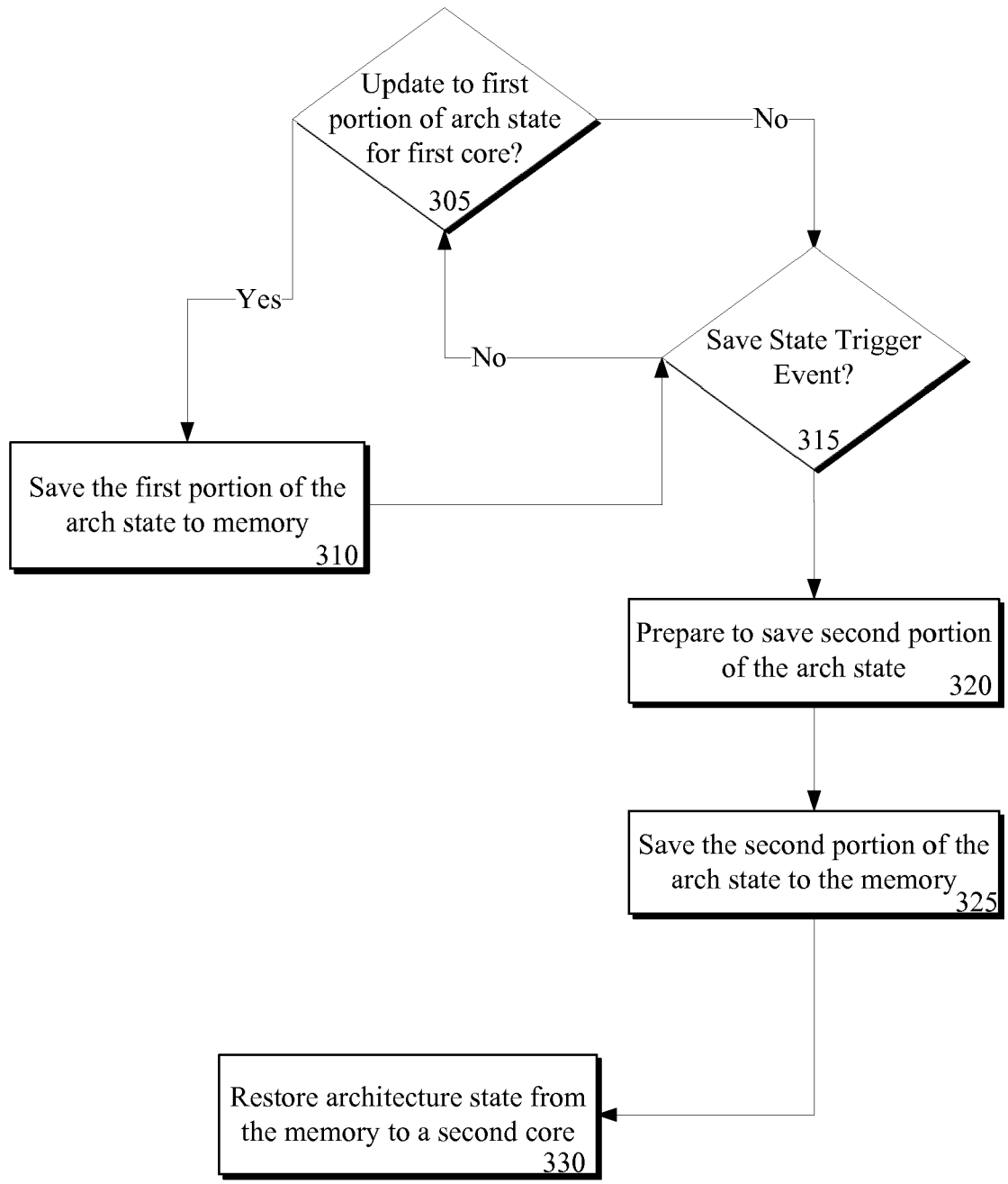
FIG. 3 illustrates an embodiment of a flow diagram for a method of saving and restoring architectural states of processing elements.

Turning to FIG. 3, an embodiment of a flow diagram for a method of transferring an architectural state from a first processing element to a second processing element of a processor is illustrated. Note that the flows are illustrated in an ordered and substantially serial manner; however, any of the flows may be performed in parallel, as well as in a different order. For example, saving a first portion of an architectural state in flow 310 may occur in parallel to detecting/determining a save state event trigger has occurred in flow 315. Furthermore, detecting a trigger event in flow 315 may occur before flow 305. In addition, even though some flows are illustrated as decision blocks, the decision may be a synchronous event or asynchronous event decision.

In flow 305, it is determined if there is an updated to a first portion of an architectural state associated with a processing element, such as a core. In one embodiment, the first portion includes infrequently updated portions of the architectural state, such as MSRs. Here, an update to an MSR is concurrently saved/written to memory in flow 310. In other words, the first portion of the architecture state is saved to memory in response to an update to the first portion of the architectural state. In one embodiment, a base address register, i.e. a destination register, is to hold a base destination address for the first portion of the architectural state to be written to.

The memory may include any memory for holding architectural states for associated processing elements of a processor. In one embodiment, the memory includes an on-die memory on the same physical processor die as the processor elements. Alternatively, the memory may include a memory device coupled to the processor, such as a system memory with a reserved memory portion for architectural states. As another example, a portion of cache or other commonly utilized memory associated with the processor is utilized to hold architectural states.

In flow 315, it is determined if a save architectural state trigger event has occurred. In one embodiment, a event register in the core includes a bitmap of events that may trigger a save state. As an example, the placement of bits within the event register that correspond to events is an indication of priority of the events. Examples of a save architectural state trigger event includes a core failure, a pipeline stall, a branch misprediction, entering/exiting a power state, entering/exiting a management mode, entering/exiting a secure environment mode, receiving an interrupt, a software related save state event, an interrupt handler event, a management software directed save state event, and a controlling software determination for a state to be saved based on manageability factors, such as power, frequency, thermal consumption, and workload.

As a specific example, controlling software, such as an operating system, may determine that a workload on a first core of a processor is to be moved to a second core of a processor. As a result, the software writes to an event register of the first core to update the event register. The write to and/or the update of the event register includes a trigger event, which results in saving of the first cores architectural state.

In flow 320, preparation is made to save a second portion of the state. In this embodiment, the first portion is concurrently saved, i.e. upon an update the most recent information is saved to memory; therefore, the most current information for the first portion is already saved to memory and does not have to be re-saved. In one embodiment, preparing to save includes waiting for an architectural state to resolve before proceeding. Often states of registers, register files, and other architectural information may be in a state of flux due to in-flight processing of instructions/operations. Therefore, to correctly save the state, in one embodiment, a delay is incurred to ensure the architectural state is settled.

Next, in flow 325 the second portion of the architectural state is saved to the memory. As described above, the information for an architectural state of different processors typically has a predefined structure when being held in memory. As a result, the predefined structure is not described in detail to avoid obscuring the invention. However, not a different predefined structure from an intuitive alignment for information for registers one after the other is often utilized. In one embodiment, the save state is facilitated/supported by hardware. For example, a destination register is to hold a destination address of the area in memory the architectural state is to be saved to. As a result, hardware, firmware, software, or a combination thereof may directly dump the second portion of the architectural state to the range of memory defined by the destination information, without extensive software interference.

In flow 330, the architectural state is restored to a second processing element, such as a core, thread, or other context. In one embodiment, the second core include a restore register to hold a restore address to restore an architectural state from.

Here, the restore address references the same address or range of addresses, which the destination address for the first core referenced. Consequently, the first core saves its state to the destination address and the second core restores that state from the destination address utilizing the destination address as a restore address.

Note that discussion of saving and restoring of a state in FIG. 3 is in reference to transferring state. However, multiplexing of multiple architecture states for single processing element may also be performed in a similar manner, i.e. multiple virtual contexts held in different ranges of memory and a current context is quickly stored to memory based on a destination address held in a register and one of the multiple virtual contexts is restored utilizing a restore address held in a restore register of the processing element.

As can be seen from above, architectural states of processing elements are efficiently saved and restored utilizing hardware. Controlling software, such as an OS, hypervisor, or manageability software, may determine workloads or states of a processing element should be transferred to another processing element in the processor. Furthermore, hardware events may cause a save state and hardware itself may determine an appropriate new processing element for restoring the state. As a result, either hardware or software may move one processing element's state to another processing element efficiently and quickly utilizing hardware support.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a first processing element including
a destination address storage element adapted to hold a destination address, wherein at least a portion of an architectural state associated with the first processing element is to be written to the destination address in response to a save architectural state event based on the destination address storage element holding the destination address; and
an event storage element adapted to hold a plurality of fields, wherein each of the plurality of fields is to correspond to a plurality of save architectural state events including the save architectural state event; and
a second processing element including a restore storage element adapted to hold the destination address as a restore address, wherein the at least the portion of the architectural state associated with the first processing element is to be restored to the second processing element from the restore address after the at least the portion of the architectural state associated with the first processor is written to the destination address in response to the save architectural state event based on the restore storage element holding the restore address.

2. The apparatus of claim 1, wherein the first and the second processing elements include processor cores.

3. The apparatus of claim 1, wherein the save architectural state event is selected from a group consisting of a power change save state event, a secure environment save state event, a management state save state event, an interrupt save state event, a core failure event, a controlling software directed save state event, and management software directed save state event.

4. The apparatus of claim 1, wherein the at least the portion of the architectural state includes information held in a Model Specific Register (MSR) associated with the first processing element, and wherein the save architectural state event includes an update of the MSR.

5. The apparatus of claim 1, wherein the destination address storage element includes a first destination address register, the restore storage element includes a first restore address register, and wherein the first processing element further includes a second restore address register to hold a second restore address of another architectural state and the second processing element further includes a second destination address register to hold a second destination address, wherein the architectural state to be restored to the second processor is to be written to the second destination address in response to a second architectural save state event after the architectural state associated with the first processing element is to be restored to the second processing element from the restore address.

6. The apparatus of claim 1, wherein the first processing element further includes an event storage element to hold a field, which corresponds to the architectural state event, wherein in response to detecting the architectural state event, the field is to be updated to an occurred event value to indicate the architectural state event has been detected.

7. The apparatus of claim 1, wherein a position of a field within the plurality of fields is to indicate a priority of the save architectural state event of the plurality of save architectural state events that corresponds to the field.

8. The apparatus of claim 1, further comprising a core source register to hold a first field corresponding to the first processing element, the first field to be updated to a save state value in response to the architectural state event to indicate the first processing element is to write the architectural state to the destination address, and wherein the core source register is to hold a second field corresponding to the second processing element, the second field to hold an active value to indicate the second processing element is not currently to save an associated architectural state.

9. The apparatus of claim 1, further comprising a core destination register to hold a first field corresponding to the first processing element, the first field to hold a non-restore value to indicate the first processing element is not to restore an architectural state, and wherein the destination source register is also to hold a second field corresponding to the second processing element, the second field to be updated to a restore value to indicate the second processing element is to restore the architectural state from the restore address.

10. A system comprising:
a processor including a number of processing cores, wherein a plurality of processing cores of the number of processing cores includes a save state destination register adapted to hold a destination address for saving an architectural state and a state restore register adapted to hold a restore address for restoring an architectural state, and wherein in response to a triggering event a first processing core of the plurality of processing cores is adapted to transfer an architectural state associated with the first processing core to a second processing core of the plurality of processing cores, wherein the first processing core further includes an event register and the triggering event includes a software write to the event register; and
a memory associated with the processor to include a plurality of ranges of the memory, wherein each of the plurality of ranges of the memory is to be associated with a destination address to be held in a save state destination register included in each of the plurality of processing cores.

11. The system of claim 10, wherein the first processing core further includes an event register and the triggering event includes an architectural event.

12. The system of claim 10, wherein the memory is to hold the software, which is to be executed by one of the number of processing cores.

13. The system of claim 12, wherein the software is selected from a group consisting of operating system software, hypervisor software, and management software.

14. The system of claim 10, wherein the processor further includes a source core register to hold a representation of the plurality of processing cores that are to save an associated architectural state and a destination core register to hold a representation of the plurality of processing cores that are to restore an architectural state.

15. The system of claim 10, wherein in response to a triggering event a first processing core of the plurality of processing cores is capable of transferring an architectural state associated with the first processing core to a second processing core of the plurality of processing cores comprises: in response to the triggering event:
the first processing core to write at least a portion of the architectural state associated with the first processing core to the range of the plurality of ranges of the memory to be associated with the destination address to be held in the destination register included in the first processing core; and
the second processing core to restore the architectural state associated with the first processing core from the range of the plurality of ranges of the memory responsive to the restore address to be held in the state restore register included in the second processing core being the same as the destination address to be held in the destination register included in the first processing core.

16. The system of claim 10, wherein the memory associated with the processor includes a memory selected from a group consisting of a private memory on a physical die of the processor including the number of processing cores, a private section of a cache memory associated with the processor, and a private portion of a system memory.

17. A method comprising:
saving a first portion of an architectural state associated with a first processing element of a processor to a range of a memory referenced in a destination storage element associated with the first processing element in response to an update to the first portion of the architectural state;
saving a second portion of the architectural state associated with the first processing element to the range of the memory referenced in the destination storage element in response to a save state triggering event, wherein the save state triggering event comprises a software program writing to a save state event register associated with the first processing element; and
restoring the architectural state to a second processing element of the processor from the range of memory referenced in a restore storage element associated with the second processing element, after saving the second portion of the architectural state to the range of the memory in response to the save state triggering event.

18. The method of claim 17, wherein the first portion of the architectural state includes a Model Specific Register (MSR) and the second portion of the architectural state includes a plurality of non MSRs, and wherein the first and second processing elements are independently selected from a group of processing elements consisting of a core, a thread, and a logical processor.

19. The method of claim 17, further comprising determining the architectural state of the first processing element is to be transferred to the second processing element.

20. The method of claim 19, wherein determining the architectural state of the first processing element is to be transferred to the second processing element comprises the software program further to determine the architectural state of the first processing element is to be transferred to the second processing element.

21. The method of claim 20, wherein the software program includes a system management application, and wherein the software management application, when executing, further to determine the architectural state of the first processing element is to be transferred to the second processing element is based on a system management factor selected from a group consisting of a thermal management factor, a performance management factor, and a power management factor.

22. The method of claim 20, wherein the software program is selected from a group consisting of an operating system, a virtual machine monitor, a hypervisor, and a highest priority level application.

23. The method of claim 17, wherein the memory includes a private memory selected from a group consisting of a private memory included on a physical die of the processor, a private section of a cache memory associated with the processor, and a system memory coupled to the processor.

* * * * *